United States Patent [19]
Green

[11] Patent Number: 5,191,546
[45] Date of Patent: Mar. 2, 1993

[54] TIME-INTERPOLATION METHOD FOR DIGITAL BEAMFORMERS

[75] Inventor: John Green, Lisbon, Conn.

[73] Assignee: The United States of America as represented by the Secretary of the Navy, Washington, D.C.

[21] Appl. No.: 643,257

[22] Filed: Jan. 22, 1991

[51] Int. Cl.⁵ .................................................. G06F 7/38
[52] U.S. Cl. .................................................... 364/723
[58] Field of Search ............................. 364/723, 724.1

[56] References Cited

U.S. PATENT DOCUMENTS

| | | | |
|---|---|---|---|
| 4,497,035 | 1/1985 | Yabuuchi et al. | 364/723 X |
| 4,511,882 | 4/1985 | Keyes, IV et al. | 364/723 X |
| 4,837,722 | 6/1989 | Sara | 364/723 |
| 4,975,866 | 12/1990 | Aoki et al. | 364/723 |

Primary Examiner—Tan V. Mai
Attorney, Agent, or Firm—Michael J. McGowan; Prithvi C. Lall; Michael F. Oglo

[57] ABSTRACT

An improved time-interpolation method for digital time-domain beamformers is provided. The method determines an input channel value at a known fractional delay as a two-stage process. In a first stage, input channel parameters common to all beams and independent of the known fractional delay are determined. In a second stage, the input channel parameters are weighted and summed for each beam to determine the input channel value at the known fractional delay. Weighting of the parameters is based upon the known fractional delay and the frequency band of interest.

5 Claims, 2 Drawing Sheets

TIME-INTERPOLATION METHOD FOR DIGITAL BEAMFORMERS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to digital time-domain beamforming and more particularly to an improved time-interpolation method for digital time-domain beamformers.

(2) Description of the Prior Art

Beamforming is the process of combining input values from spatially separated receiving elements (which form an array of input channels) such that the output responds most strongly to signals arriving from a specific direction. Typically, many beams are formed simultaneously from a set of input channels with each beam pointing in a different direction. The processing associated with a single beam will be referred to herein as a beam process. In the time domain, a beam process consists of forming a weighted sum of time delayed input channels where the time delays are determined by the look direction of the beam. In a sampled time system, the time-delayed value of an input channel is generally created by interpolating between the nearest time sampled values to generate an estimate of the signal that existed at the desired delay time. The time delay of the input channel is thus composed of an integer delay (i.e., the number of sample intervals to the nearest sample) plus an interpolated fractional delay. A detailed discussion of time-delayed beamforming can be found in "Principles of Underwater Sound for Engineers" by Robert J. Urick, McGraw Hill Publishing Company, 1975.

There are several prior art methods of generating the value of the input channel at the fractional delay when beamforming. In one method, each beam process fractionally delays each channel input. A beam process delays each channel individually by using a separate interpolation filter for each channel. This requires a processing load which is proportional to the product of the number of channels, the number of beams, and the number of coefficients in the interpolation filter. Accordingly, this method requires a large processing load which limits the number of beams which can be formed simultaneously.

In a second prior art method, each channel is preprocessed by a complete set of interpolation filters to thereby increase the sampling rate. The sampling rate is increased by a ratio sufficient to reduce the error associated with using the nearest available sample delay. This up-sampled set of channel values is then transmitted to the beam processors. Each beam process then selects the appropriate fractionally delayed value for each channel as it forms its beam. Although this second method can significantly reduce the processing load compared with the previous method, it has the disadvantage of requiring a high communication bandwidth to transmit the up-sampled channel values to the beam processors.

SUMMARY OF THE INVENTION

Accordingly, it is an object of the present invention to provide an improved time-interpolation method for a digital timedomain beamformer that reduces the processing load of the beamformer to reduce the overall processing time while simultaneously limiting or reducing the communication bandwidth of the beamformer.

Other objects and advantages of the present invention will become more obvious hereinafter in the specification and drawings.

These objects are accomplished with the method of the present invention for a time-sampled, beamforming system. The beamforming system has a plurality of input channels where each input channel has a known time delay associated with each beam. The known time delay consists of a known integer delay and a known fractional delay. The method of the present invention uses a two-stage process to determine, through interpolation, an input channel value at the known fractional delay. In the first stage, input channel parameters are determined for each input channel. These parameters are common to all fractional delays and thus to all beams being processed. Thus, the input channel parameters need only be determined once for each channel and may be used in the interpolation process for each beam. For each individual beam in the second stage, each set of input channel parameters are weighted based upon the input channel's known fractional delay. The weighted input channel parameters are then summed for each beam to form each input channel value at the known fractional delay. By determining input channel parameters that are common to all beams, the processing load and communication bandwidth are decreased with respect to prior art methods.

DESCRIPTION OF THE PREFERRED EMBODIMENT

In a time-sampled beamforming system, the time delayed value of an input channel is composed of a value at an integer delay plus an interpolated value at a fractional delay. It is the novel method of determining this interpolated value that will now be described. It is assumed that the processing of the value at the integer delay may be accomplished with conventional processing techniques. Accordingly, the ensuing description and accompanying drawings will focus only on the method of determining the interpolated value at the fractional delay.

Since the method of the present invention holds true for each input channel of a beamforming system, the description will focus on the determination of the interpolated value for only one input channel at its respective fractional delay. The fractional delay for a particular input channel is a function of the look direction of a beam and the location of the input channel's detecting element with respect to a reference point. The choice of a reference point is arbitrary and does not constrain the method of the present invention. The fractional delay for any input channel/beam look direction is known and is typically contained in a database.

Figure 1:
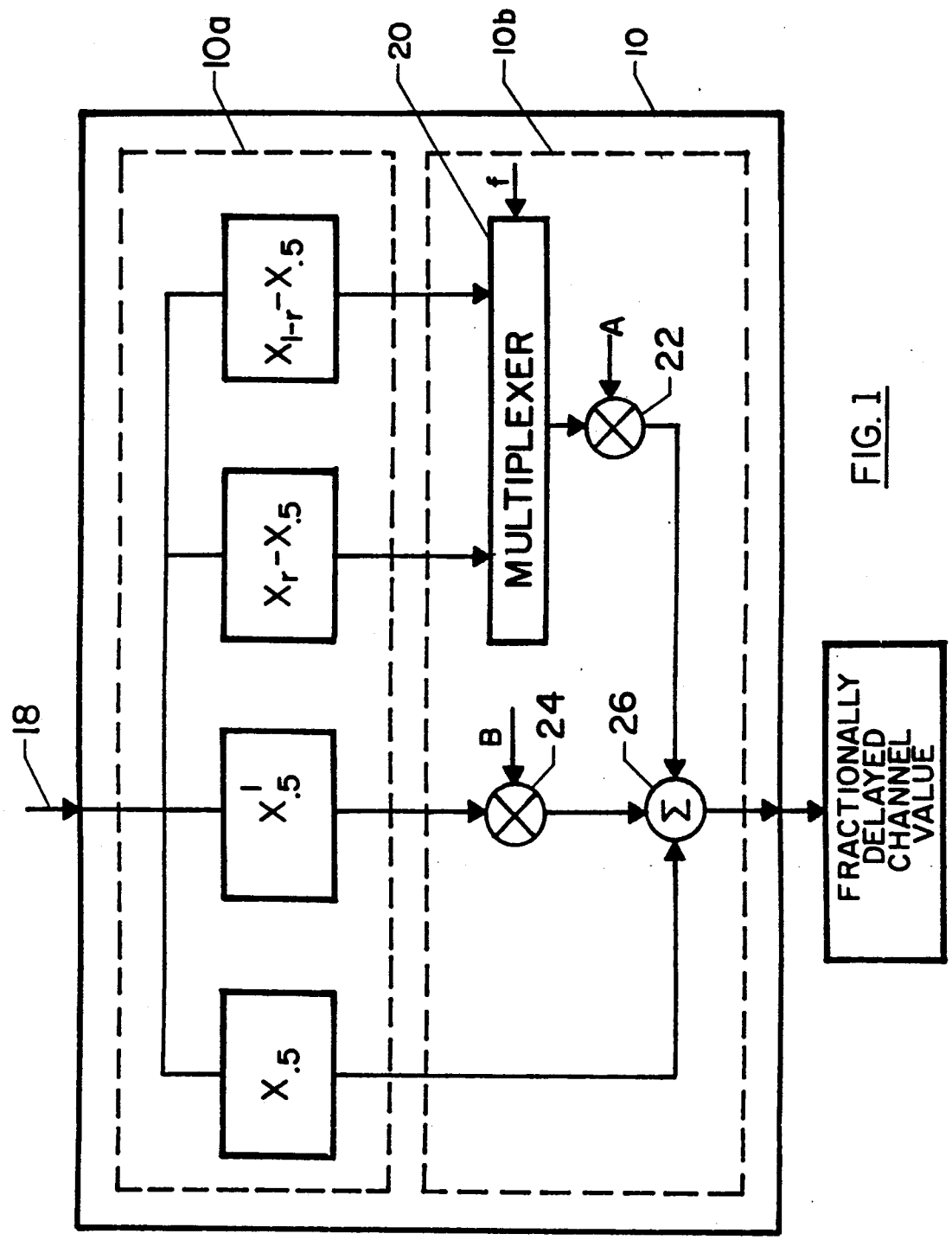
FIG. 1 is a detailed schematic view of the two-stage, fractional delay beam processor for a single channel according to the method of the present invention.

Referring now to the drawings, and in particular to FIG. 1, the two-stage fractional delay beam processor 10 generates the fractionally delayed, input channel values for an input channel 18. In the preferred embodiment, the first stage of the interpolation process is the portion designated by numeral 10a and the second stage of interpolation process is designated by numeral 10b.

The first stage of the interpolation process involves the calculation of four input channel parameters. A first parameter or value of input channel 18 is determined for a fractional delay of 0.5 and is designated in FIG. 1 as $X_{0.5}$. Next, the rate of change or derivative of $X_{0.5}$ is calculated and is designated as $X'_{0.5}$. The last two parameters of input channel 18 are $(X_r - X_{0.5})$ and $(X_{1-r} - X_{0.5})$ where r is a small fractional delay such as 0.06. Determination of each of these parameters can be accomplished by a variety of techniques. One such technique might employ an Finite Impulse Response (FIR) filter (not shown) to determine $X_{0.5}$.

Figure 2:
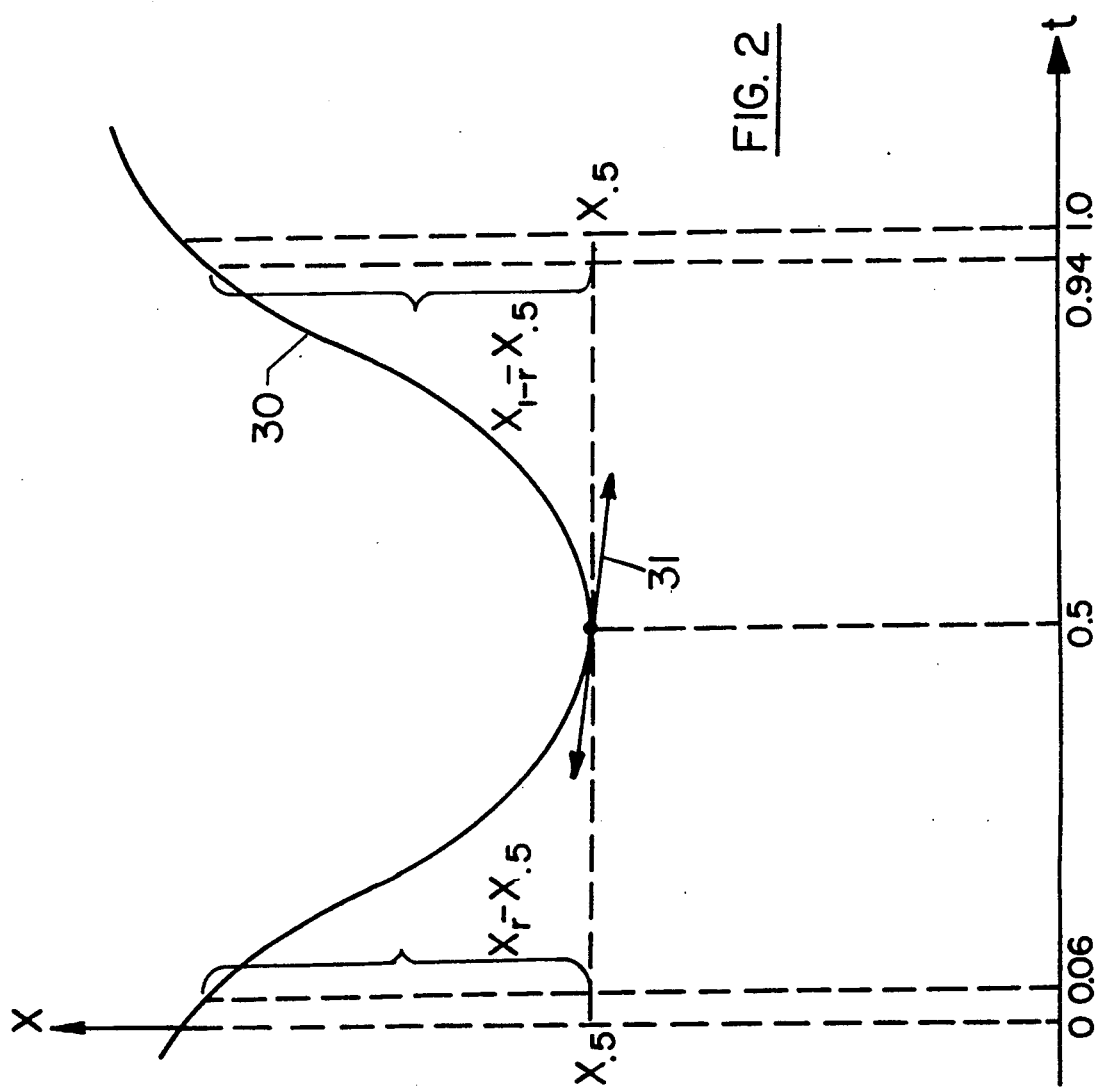
FIG. 2 is the graph of an analog waveform representative of the time-domain beam information received at a detecting element.

FIG. 2 shows the shape of a typical analog waveform 30. Waveform 30 is representative of the time-domain beam information received at a detecting element. Two integer time samples are shown at time t=0 and t=1. An input channel value X at a known fractional delay f, hereinafter referred to as $X_f$, will fall somewhere between t=0 and t=1 on waveform 30. Graphically, the input channel value at the fractional delay $X_f$ is approximated by moving a linear distance determined by the fractional delay f along a line 31 tangent to the point $X_{0.5}$ based upon the slope at $X_{0.5}$. This linear interpolation value is then corrected by using the change from the $X_{0.5}$ value and the value $X_r$ or $X_{1-r}$ near the end of the interpolation interval. The magnitude of this correction as well as which end of the interpolation interval is used depends on the desired fractional delay f. Basing the correction on the value near the end of the interval results in a smaller "worst case error" than if the correction was based on the value at t=0 or t=1. Note that for clarity of illustration the slope of tangent line 31 has been slightly exaggerated. It is to be further understood that the shape of waveform 30 is for purposes of illustration only and that the method of the present invention is not limited to waveform 30 as shown.

The first stage of the process 10a is common to all incoming beams and is independent of the known fractional delay. Accordingly, these four values can be pre-computed and then used for forming all beams. To complete the beamforming process, the four values are passed to the second stage of the process 10b. The second stage of the process 10b is performed for each beam to form the appropriate fractionally delayed input channel value.

In the second stage of the process 10b, one of the two values $(X_{1-r} - X_{0.5})$ and $(X_{1-r} - X_{0.5})$ is selected depending upon the known fractional delay f. If f≦0.5, then $(X_r - X_{0.5})$ is selected and if f>0.5, then $(X_{1-r} - X_{0.5})$ is selected. Selection is typically accomplished with a multiplexer 20 supplied with information on the known fractional delay f. The selection is then weighted at multiplier 22 by a coefficient A to minimize gain and phase error of the interpolated result over a desired frequency band. Similarly, the rate of change or derivative $X'_{0.5}$ is weighted at multiplier 24 by a coefficient B to minimize gain and phase error over the frequency band.

The A and B coefficients for a given fractional delay are typically determined by dividing the frequency band over which the beamformer is to operate into many closely spaced points. At each of these points, the real and imaginary points of the interpolation response can be compared to the ideal response and thus the magnitude of the error determined. The maximum error over the frequency band can then be minimized by iterating values of A and B using a method such as gradient descent. Values of coefficients A and B are generally stored in a database table.

As a final process step for each beam, the aforementioned values are summed at summer 26 to generate the fractionally delayed channel value $X_f$ where for f≦0.5, $$X_f = X_{0.5} + B(X'_{0.5}) + A(X_r - X_{0.5}) \quad (1)$$

and for f>0.5, $$X_f = X_{0.5} + B(X'_{0.5}) + A(X_{1-r} - X_{0.5}) \quad (2)$$

This first and second stage processing is repeated at each input channel 18.

The advantages of the present invention are numerous. The method splits the fractional delay value interpolation portion of the beam forming process into two stages:

1) a first stage generating input channel parameters common to all beams and independent of the known fractional delay, and 2) a second stage using the input channel parameters to generate the input channel value at the known fractional delay. For large beamforming systems with many beams requiring fine interpolation precision, this method results in significant computational savings over the prior art methods. Since the first stage of the process is common to all beams, the processing load is decreased. Furthermore, the precision gained by using the four input channel parameters removes the need for an increased sampling rate thereby reducing the communication bandwidth requirements of the beamformer.

Alternatives to the present invention include the calculation of a second derivative of $X_{0.5}$ or $X''_{0.5}$. This would provide further detail and accordingly, increase precision if needed. In contrast, where such precision may be less important, the values of $X_r$ and $X_{1-r}$ could be replaced by the integer values $X_0$ and $X_1$. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a time-sampled, acoustic beam forming system including a plurality of spatially separated receiving elements forming a plurality of input channels, each input channel having a known time delay associated with each beam, each time delay consisting of 1) a known integer delay and 2) a known fractional delay, a method of generating an input channel value at the known fractional delay using a two-stage fractional delay beam processor comprising the steps of:

generating, at a first stage of the two-stage processor, a first value of the signal of each of said plurality of input channels at a fractional delay of 0.5, said first value being common to all acoustic beams;

generating, at the first stage, a rate of change based on said first value;

generating, at the first stage, a second value of the signal of each of said plurality of the input channels at a fractional delay of approximately 0.06, said second value being common to all said acoustic beams, and further calculating a difference between said first and second values;

generating, at the first stage, a third value of the signal of each of said plurality of input channels at a fractional delay of approximately 0.94, said third value being common to all said acoustic beams, and further calculating a difference between said first and third values;

comparing, at a multiplexer in a second stage of the two stage processor, said first and second value difference with said first and third value difference for each of said acoustic beams wherein said first and second value difference is selected to pass through the multiplexer when the known fractional delay is less than or equal to 0.5 and wherein said first and third value difference is selected to pass through the multiplexer when the known fraction delay is greater than 0.5;

weighting, at a first multiplier in the second stage said rate of change for each of said acoustic beams based upon the known fractional delay;

weighting, at a second multiplier in the second stage, said selected value difference for each of said acoustic beams based upon the known fractional delay; and summing, at a summer in the second stage, said first value, said weighted rate of change and said weighted value difference to form each input channel value.

2. In the time-sampled, beam forming system including a plurality of hydrophones forming a plurality of input channels, each input channel having a known time delay associated with each beam, each time delay consisting of 1) a known integer delay and 2) a known fractional delay, a method of generating an input channel value at the known fractional delay using a two-stage fractional delay beam processor comprising the steps of:

generating input channel parameters for each input channel in a first stage of the two-stage processor, said input channel parameters being common to all acoustic beams and independent of the known fractional delay;

weight, in a second stage of the two-stage processor, a portion of said input channel parameters for each of said acoustic beam based upon the known fractional summing, in the second stage, said weighted input channel parameters for each of said acoustic beam to form the input channel value at the known fractional delay.

3. A method according to claim 2 wherein said step of generating further comprises the steps of:

selecting a first input channel parameter, said first input channel parameter being an input channel value between the known integer delay and a next known integer delay;

generating a first derivative of said first input channel parameter to form a second input channel parameter; and generating third and fourth input channel parameters, said third and fourth input channel parameters being formed as respective differences between said first input channel parameter 1) the input channel value at approximately the known integer delay, and 2) the input channel value at approximately the next known integer delay.

4. A method according to claim 3 further comprising the step of generating a second derivative of said first input channel parameter to form a fifth input channel parameter.

5. In a time-sampled acoustic beamforming system comprising a plurality of spatially separated receiving elements acting as a plurality of input channels, each input channel having a specified time delay before adding the inputs of all input channels to obtain each of a plurality of directed acoustic beams, a method for determining the delayed response of each of said plurality of input channels for a directed acoustic beam from a preselected direction using a two-stage fractional delay beam processor, said method includes the steps of:

obtaining, in a first stage of the two-stage processor, a fractional time delay of 0.5 designated as $X_5$, for an input channel of said plurality of input channels;

calculating, in the first stage, the rate of change of said fractional delay of 0.5 designated as $X'_{0.5}$ for said input channel;

calculating, in the first stage, $X_r - X_{0.5}$ for said input channels;

calculating, in the first stage, $X_{1-r} - X_{0.5}$ where r is a small fraction;

weighting $X'_{0.5}$, in a second stage of the two-stage processor, for each of said acoustic beam based upon the known fractional delay;

selecting, at a multiplexer in the second stage, one of said $X_r - X_{0.5}$ or $X_{1-r} - X_{0.5}$ based upon the known fractional delay;

weighting one of said selected $X_r - X_{0.5}$ or $X_{1-r} - X_{0.5}$ for each of said acoustic beams based upon the known fractional delay; and summing, at a summer in the second stage, said $X_{0.5}$, said weighted $X'_{0.5}$ and said weighted one of said $X_r - X_{0.5}$ and $X_{1-r} - X_{0.5}$ to form each input channel value.

* * * * *